(12) United States Patent
Sugikawa

(10) Patent No.: US 6,485,865 B1
(45) Date of Patent: Nov. 26, 2002

(54) POROUS METAL SHEET, BATTERY ELECTRODE PLATE COMPOSED OF POROUS METAL SHEET AND BATTERY HAVING ELECTRODE PLATE

(75) Inventor: Hirofumi Sugikawa, Toyonaka (JP)

(73) Assignee: Katayama Special Industries, Ltd., Osaka-fu (JP)

( * ) Notice: Subject to any disclaimer, the term of this patent is extended or adjusted under 35 U.S.C. 154(b) by 71 days.

(21) Appl. No.: 09/593,443

(22) Filed: Jun. 15, 2000

(30) Foreign Application Priority Data

Jun. 15, 1999 (JP) .......................................... 11-167778

(51) Int. Cl.[7] ................................................ H01M 4/70
(52) U.S. Cl. ............................... 429/235; 429/233; 29/2
(58) Field of Search .................... 29/2, 623.1; 429/233, 429/235

(56) References Cited

U.S. PATENT DOCUMENTS

| | | | | |
|---|---|---|---|---|
| 4,357,393 A | * | 11/1982 | Tsuda et al. ................. | 181/294 |
| 5,637,416 A | * | 6/1997 | Yoshii et al. ................ | 429/223 |
| 6,117,593 A | * | 9/2000 | Stachoviak et al. ........ | 29/623.5 |

* cited by examiner

Primary Examiner—Carol Chaney
(74) Attorney, Agent, or Firm—Sughrue Mion, PLLC

(57) ABSTRACT

A porous metal sheet, for use in a battery electrode substrate, composed of a two-layer structure consisting of a first and second foamed metal layers or a structure having three or more layers consisting of the first and second foamed metal layer, a mesh metal layer and the like sandwiched between said first and second layer. The number of cells of the first foamed metal layer is smaller than that of the second foamed metal layer. The electrode plate is spirally wound with the second foamed metal layer located at a peripheral side and with the first foamed metal layer located at an inner peripheral side.

14 Claims, 11 Drawing Sheets

POROUS METAL SHEET, BATTERY ELECTRODE PLATE COMPOSED OF POROUS METAL SHEET AND BATTERY HAVING ELECTRODE PLATE

BACKGROUND OF THE INVENTION

1. Field of the Invention

The present invention relates to a porous metal sheet composed of a layered structure, a battery electrode plate composed of the porous metal sheet, and a battery having the electrode plate. More particularly, the present invention relates to a porous metal sheet that is wound spirally to accommodate it in a cylindrical battery can of a secondary battery such as a nickel cadmium battery, a nickel hydrogen battery, and the like.

2. Description of the Related Art

As a positive plate and a negative plate for use in the nickel cadmium battery, the nickel hydrogen battery, and the like, porous metal sheets are hitherto used. The porous metal sheet is formed by plating a foamed three-dimensional reticulate porous material such as a polyurethane sponge; a nonwoven cloth; and a mesh net.

Of the above porous metal materials, a foamed metal sheet, which is formed by plating the polyurethane sponge and then burning the polyurethane, has a higher porosity than a punching metal and the like. Thus, the foamed metal sheet can be charged with a larger amount of an active substance than other porous metal sheets. Further, pores are three-dimensionally present in the foamed metal sheet. Thus, the foamed metal sheet holds the active substance therein in a high extent. Therefore, the porous metal sheet consisting of the foamed metal sheet is preferably used as an electrode substrate.

In the conventional electrode substrate composed of only the foamed metal sheet, needless to say, the number of cells on one side (surface) of the electrode substrate is almost equal to the number of cells on the other side thereof. In the case of the electrode substrate composed of the foamed metal sheets disposed on its both sides and a mesh metal sheet or a nonwoven metal sheet sandwiched between the foamed metal sheets, the number of cells of the foamed metal sheet disposed on its one side is almost equal to that of cells of the foamed metal sheet disposed on its other side. This is because both-side foamed metal sheets are formed by plating the urethane sponge made of the same material.

The electrode substrate composed of the foamed metal sheet is charged with the active substance to form an electrode plate. The rigidity of the electrode substrate is increased by charging it with the active substance. When the electrode plate is accommodated in a cylindrical can, which has a small inner diameter, by spirally winding it, it is wound at a very small curvature to accommodate it in the cylindrical can in a required volume or more than the required volume. Thus, normally, the electrode plate is so wound that the inner diameter of an innermost spiral circle of the electrode plate is as small as about 3 mm. Consequently, as shown by the photograph of FIG. 7A and the illustration of FIG. 7B, the rigid electrode plate is susceptible to crack. Because the electrode plate has a certain thickness, the elongation percentage of the outer periphery thereof is higher than that of the inner periphery thereof. Thus, a crack C and a breakage B are liable to occur from the outer periphery of the electrode plate. With the recent demand for the development of a miniaturized battery and for increase in its capacity, this type of crack and breakage occur more frequently than before.

With reduction of the strength of the electrode plate relative to a tensile force, the electrode plate is susceptible to small cracks but is not susceptible to a large crack or breakage when it is wound. As a method of reducing the strength of the electrode plate, it is conceivable to increase the number of cells of the foamed sheet and to increase the number of frameworks surrounding the cells (pores). Supposing that the same amount is deposited on a unit area of a foamed sheet, the amount deposited on a surface area-increased framework becomes small. Consequently, the foamed metal sheet has a narrow framework and hence a low strength. However, when a resulting foamed metal sheet is charged with the active substance while it is being successively fed, the foamed metal sheet cannot be charged with the active substance efficiently at a high feeding speed because it has a low strength relative to a tensile force. Further, when the foamed material is plated while it is being successively fed, it cannot be plated efficiently at a high feeding speed as in the case of the time when the foamed metal sheet is charged with the active substance. Further, when the number of cells is increased, it is difficult to plate the inner side of the foamed material made of the urethane sponge, because the diameters of the cells are small. In this case, the foamed material is plated non-uniformly.

On the other hand, as a method of increasing the strength of the electrode plate, it is conceivable to decrease the number of cells of the foamed material to reduce the surface area of the framework surrounding the cells. Supposing that the same amount is deposited on a unit area of a foamed material, the amount deposit on a surface area-decreased framework becomes large. Consequently, the foamed metal sheet has a thick framework and hence a high strength. Therefore, it is possible to charge the resulting foamed metal sheet with the active substance efficiently at a high feeding speed. However, because the foamed metal sheet has a high strength relative to the tensile force, it is difficult to wind the foamed metal sheet when the foamed metal sheet is wound at a small curvature. Further, the foamed metal sheet cracks occur deep into the inner peripheral side thereof and is thus susceptible to breakage. The broken portion of the foamed metal sheet may break through a separator.

SUMMARY OF THE INVENTION

The present invention has been made in view of the above-described situation. Thus, it is an object of the present invention to prevent a electrode from cracking deeply and broken when it is spirally wound, allow a winding work to be accomplished smoothly, and prevent a feeding speed from being reduced when it is charged with an active substance.

In order to achieve the object, according to the present invention, there is provided a porous metal sheet, for use in a battery electrode substrate, composed of a two-layer structure consisting of a first foamed metal layer and a second foamed metal layer or a structure having three or more layers consisting of the first foamed metal layer, the second foamed metal layer, one or more metal layer sandwiched between said first foamed metal layer and said second foamed metal layer and selected from a group consisting of a mesh metal layer, a nonwoven metal layer or/and a metal sheet layer having uniform pattern pores formed therethrough. In the porous metal sheet having the construction, the number of cells of the first foamed metal layer and that of the second foamed metal layer are different from each other.

The number of cells of the second foamed metal layer is more than that of the first foamed metal layer by specifying the number of cells of the first foamed metal layer to 30 PPI or more and less than 60 PPI and specifying the number of cells of the second foamed metal layer to 50 PPI or more and less than 80 PPI.

The number of cells of the first foamed metal layer is set to 30 PPI or more and less than 60 PPI for the following reason: if the number of cells of the first foamed metal layer is less than 30 PPI, i.e., because the number of cells thereof is too small, the first foamed metal layer has a small active substance-holding force. Further, because the diameters of cells are large, the utilization percentage of the active substance deteriorates because the active substance is not electrically conductive. If the number of cells of the first foamed metal layer is 60 PPI or more, it is difficult to allow the mechanical property of the first foamed metal layer to be different from that of the second foamed metal layer. The reason the number of cells of the second foamed metal layer is set to 50 PPI or more is because if the number of cells of the second foamed metal layer is less than 50 PPI, it is difficult to generate small cracks on the second foamed metal layer. On the other hand, if the number of cells of the second foamed metal layer is 80 PPI or more, the second foamed metal layer has a too low tensile strength.

It is preferable to set the number of cells of the first foamed metal layer to 45 PPI or more and less than 55 PPI and the number of cells of the second foamed metal layer is more than 56 PPI or more and less than 65 PPI.

PPI is a unit indicating the number of cells (pore) per inch. For example, 30 PPI means that the number of cells per inch is about 30, and 80 PPI means that the number of cells per inch is about 80. When the number of cells per inch is as small as 30, the number of frameworks surrounding pores is small, and thus the surface area of the framework per inch is small. When the number of cells per inch is as large as 80, the number of frameworks surrounding pores is large, and thus the surface area of the framework per inch is large. Supposing that the same amount is deposited on a unit area of a foamed material, the foamed material, which has a decreased number of cells to reduce the surface area of its framework, has a larger deposit amount and a larger deposit thickness on its framework. Further, because the foamed material has large-diameter cells, the foamed material made of the urethane sponge can be plated uniformly and inwardly. Therefore, the framework surrounding the cells is thick and thus has a high strength relative to a tensile force. On the other hand, the foamed material, which has a large number of cells and a surface area-large framework, has a less deposit amount on its framework and thus a deposit thickness is small. Further, because it has small-diameter cells, it is difficult to plate the foamed material inward. Therefore, the framework surrounding the cells is thin and thus has a low strength relative to the tensile force.

It is preferable to use polyurethane sponge having a thickness of 0.5 mm–3.0 mm and a pore diameter of 200 $\mu$m–800 $\mu$m as a base material of the both-side foamed metal layers. It is preferable to use metals Cu, Ni, Ni alloy, Zn, Sn, Pd, Pb, Co, and Fe as the metal to be used to plate them.

The above-described porous metal sheet is produced as follows: initially, foamed materials of urethane sponge or the like having different number of cells are layered on each other and layered surfaces thereof are bonded to each other with an adhesive agent or welded to each other; or they are layered on each other with a mesh, a nonwoven cloth, and/or a metal sheet having pores of uniform pattern sandwiched between the foamed materials and layered surfaces thereof are bonded to one another with the adhesive agent or welded to one another. Then, the layered structure is plated. Then, it is sintered and the resin is removed by burning it. In this manner, the porous metal sheet having the foamed metal layers having different number of cells formed at both sides thereof is produced.

The present invention provides a battery electrode plate composed of an active substance-applied porous metal sheet having foamed metal layers, formed at both sides thereof, having different number of cells, different strengths and different elongation percentages relative to a tensile strength.

The present invention provides a battery accommodating an electrode plate in a cylindrical can. The electrode plate is spirally wound with the second foamed metal layer located on the outer side thereof and with the first foamed metal layer located on the inner side thereof.

As described above, in the present invention, the electrode plate is wound, with the second foamed metal layer located on the outer side thereof. This is because the second foamed metal layer has more cells and narrower framework and thus has a lower degree of strength and a lower elongation percentage relative to a tensile force than the first foamed metal layer. Further, as described previously, the outer side of a circular plate has a higher elongation percentage than the inner side thereof. Therefore, the second foamed metal layer is very susceptible to a lot of small cracks. Owing to the generation of the many small cracks, the electrode plate can be wound smoothly. Further, because a lot of small cracks are generated on the outer side of the electrode plate, it is difficult for a crack generated on its outer side to reach its inner side. That is, the electrode plate can be prevented from being destroyed. Furthermore, in feeding the porous metal sheet to charge it with an active substance to form the electrode plate, it is possible to feed the porous metal material at a high speed by pulling it at a high degree of force because the first foamed metal layer having a higher strength relative to a tensile force is disposed at the inner side of the porous metal sheet. Thus the productivity of the electrode plate can be improved.

DETAILED DESCRIPTION OF THE PREFERRED EMBODIMENTS

The embodiment of the present invention will be described below with reference to the drawings.

Figure 1:
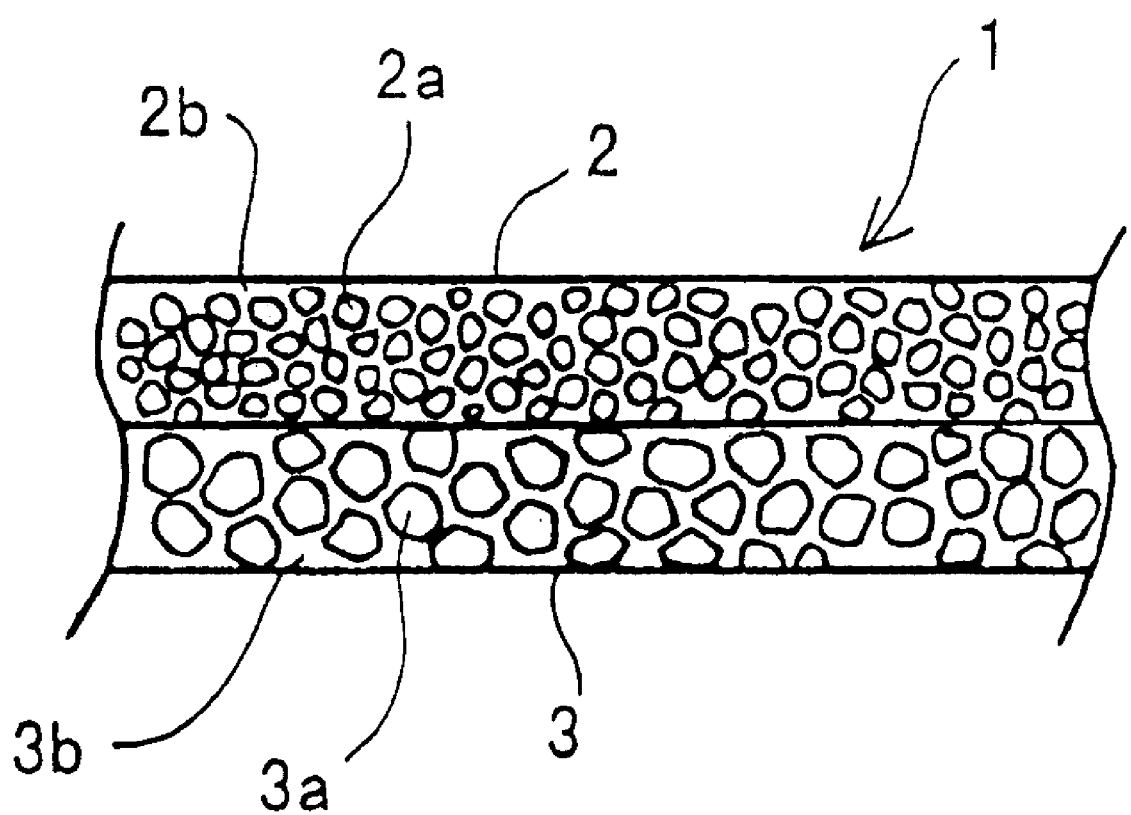
FIG. 1 is a sectional view showing a porous metal sheet of a first embodiment of the present invention.
Figure 2A:
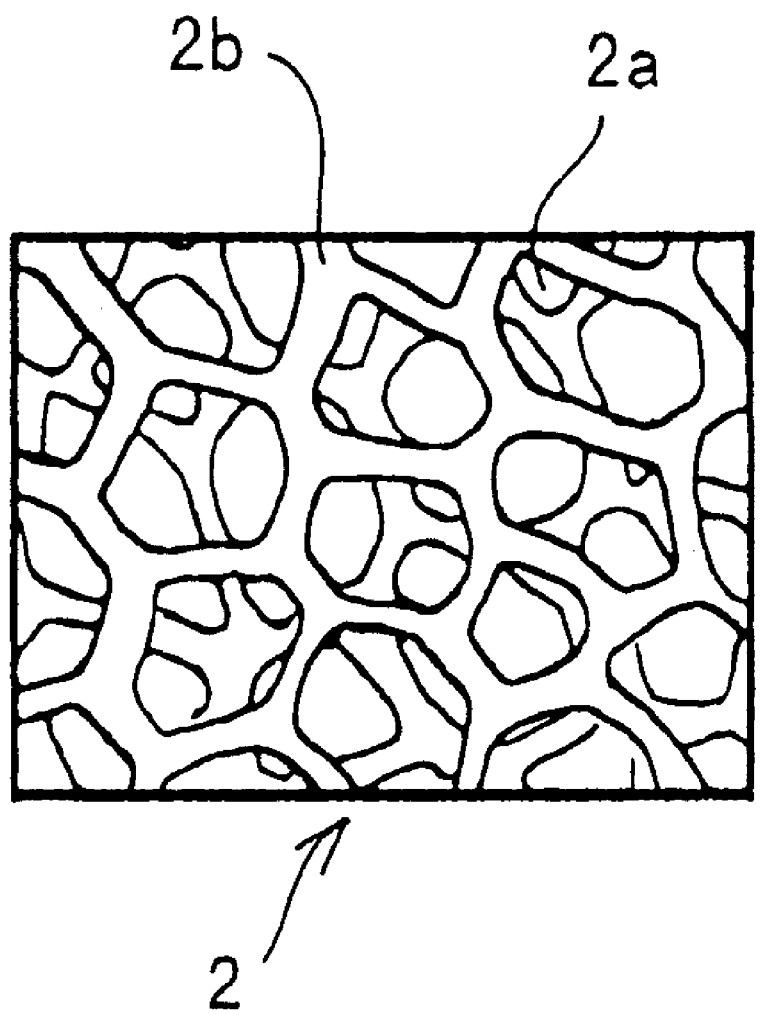
FIGS. 2A and 2B are partly enlarged views showing the porous metal sheet shown in FIG. 1.
Figure 2B:
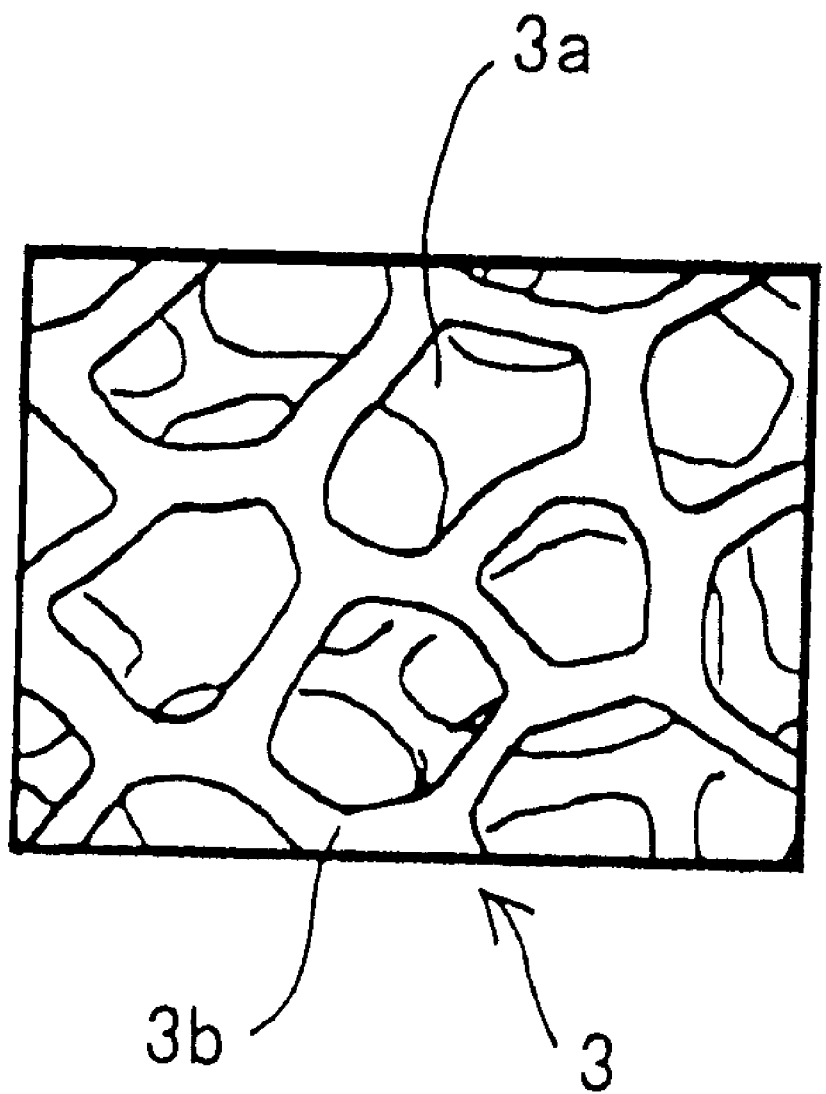

FIG. 1 shows a porous metal sheet 1 of a first embodiment. The porous metal sheet 1 has a two-layer construction consisting of a first foamed metal layer 3 and a second foamed metal layer 2. The number of cells of the second foamed metal layer 2 is 60 PPI. The number of cells of the first foamed metal layer 3 is 47 PPI. Accordingly, as shown in FIGS. 2A and 2B, pores 2a of the second foamed metal layer 2 are small, and a metal framework 2b surrounding the pores 2a is narrow to reduce both the strength and the elongation percentage of the second foamed metal layer 2 relative to a tensile force thereof. On the other hand, pores 3a of the first foamed metal layer 3 are large, and a metal framework 3b surrounding the pores 3a is thick to increase the strength the elongation percentage relative to the tensile force and thereof.

To compose the porous metal sheet 1, a two-layer urethane sponge sheet having a thickness of 1.4 mm is formed by bonding a urethane sponge sheet whose thickness is 0.9 mm and number of cells is 60 PPI to a urethane sponge sheet whose thickness is 0.9 mm and number of cells is 47 PPI. The two-layer urethane sponge sheet is fed to a plating apparatus to plate it after imparting electrical conductivity thereto. In the plating apparatus, the two-layer urethane sponge sheet is nickel-plated at 400 g/m². After it is plated, it is introduced into a resin-removing oven to heat it at 700° C.–800° C. to burn out the urethane sponge. Then, it is introduced into a sintering oven to sinter it in a reducing atmosphere. In this manner, the porous metal sheet 1 shown in FIG. 1 is produced.

By the plating treatment of the two urethane sponge sheets, the metal (Ni) deposits on and adheres to the surface of the framework surrounding the pores thereof and a bonded portion of each of the two urethane sponge sheets. In the resin removal performed after the plating treatment is carried out, the urethane sponge sheet is burned out. As a result, the porous metal sheet 1 consists of the plating metal and has a foamed state. That is, the porous metal sheet 1 has a layered structure consisting of the first foamed metal layer 3 and the second foamed metal layer 2 that has adhered to the first foamed metal layer 3.

In the first embodiment, the urethane sponge sheet is plated at 400 g/m². Thus, each of the two urethane sponge sheets is plated at about 200 g/m². The number of the cells of the one-side urethane sponge sheet is 60 PPI. The number of the cells of the other-side urethane sponge sheet is 47 PPI. The area of the framework of the one-side urethane sponge sheet is larger than that of the framework of the other-side urethane sponge sheet by 22.8%. Therefore, the deposit thickness of the framework of the one-side urethane sponge sheet is smaller by 22.8% than that of the framework of the other-side urethane sponge sheet. Thus, as shown in FIGS. 2A and 2B, the framework 2b of the second foamed metal layer 2 surrounding a large number of the pores 2a is narrow and has a lower strength. On the other hand, the framework 3b of the first foamed metal layer 3 surrounding the pores 3a is thick and has a higher strength and elongation percentage.

In the first embodiment, the deposit amount of the metal for plating a unit area of the one-side urethane sponge sheet is almost equal to that of the metal for plating a unit area of the other-side urethane sponge sheet. However, needless to say, the deposit amounts of the metal for plating the unit area of both-side urethane sponge sheets may be different from each other. In this case, it is preferable to wind the porous metal sheet, with the other-side urethane sponge sheet having the larger deposit thickness located at the inner side.

In the first embodiment, the thickness of the one-side urethane sponge sheet is equal to that of the other-side urethane sponge sheet. But the one-side urethane sponge sheet may be layered on the other-side urethane sponge sheet by differentiating the thickness of the former and that of the latter from each other. In this case, it is preferable to wind the porous metal sheet, with the urethane sponge sheet having the larger deposit thickness located at the inner side.

In the above-described process, the porous metal sheet 1 consisting of the second foamed metal layer 2 and the first foamed metal layer 3 is produced as a thin continuous sheet having a thickness of about 1.5 mm and wound in the shape of a coil. After an active substance such as nickel hydroxide or the like is supplied to the porous metal sheet 1 wound in the shape of a coil, the porous metal sheet 1 is pressurized with a roller to charge it with the active substance. As a result, an electrode plate having a thickness of about 0.7 mm is produced. The produced porous metal sheet 1 is required to have a tensile strength more than 2 kgf/2 cm and preferably more than 5 kgf/2 cm. The porous metal sheet 1 has a tensile strength of 5–7 kgf/2 cm. Therefore, it can be charged with the active substance, with a tensile strength being successively applied thereto. That is, the active substance is filled into the pores 3a of the first foamed metal layer 3 and the pores 2a of the second foamed metal layer 2 and also onto the surfaces 3c and 2c thereof. As a result, the porous metal sheet 1 becomes so hard that it cannot be easily curved because it has been charged with the active substance.

Figure 3:
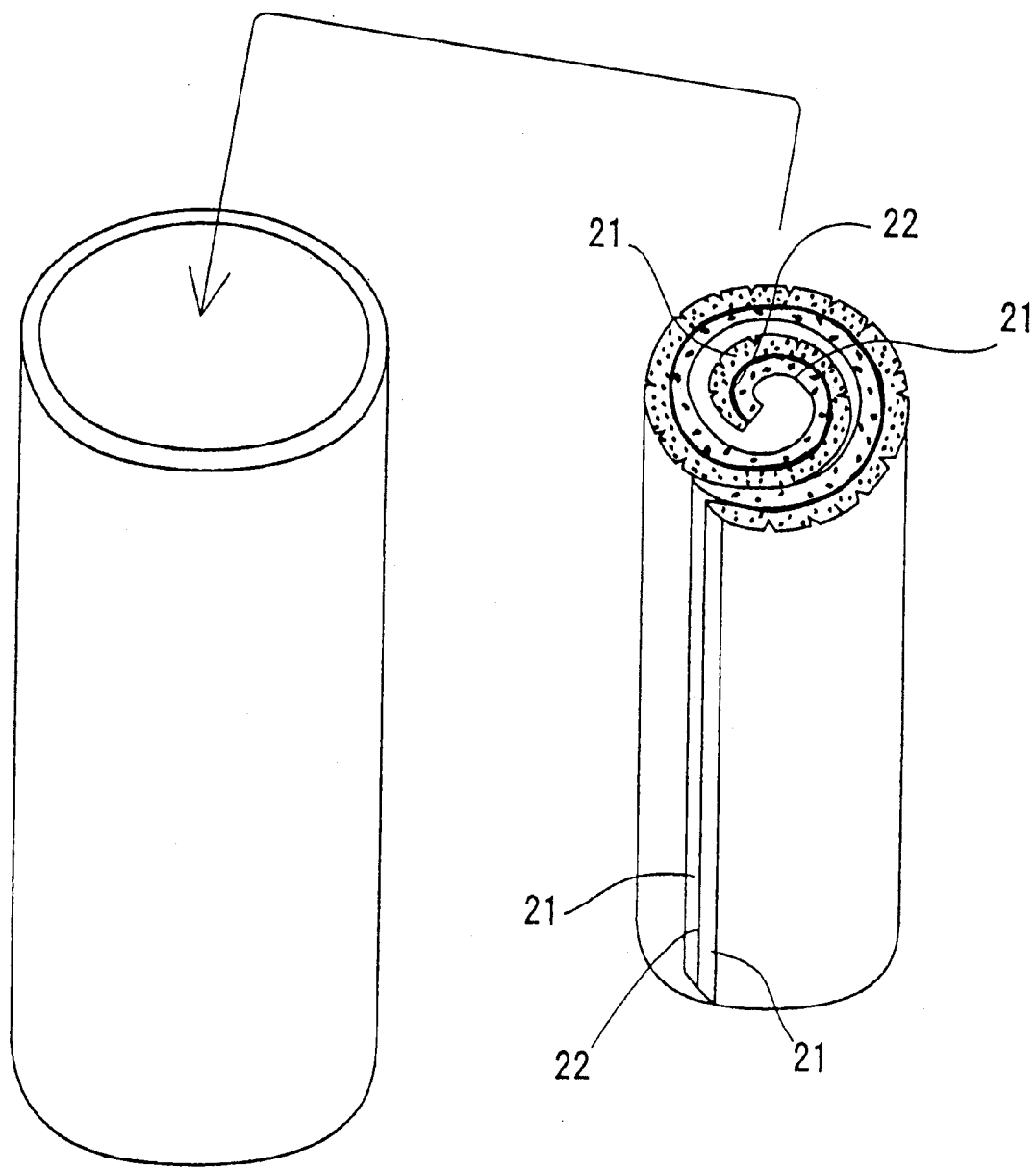
FIG. 3 is a schematic view showing a mode of accommodating a electrode plate wound spirally in a battery can.

After the porous metal sheet 1 is charged with the active substance in the above-described manner, the porous metal sheet 1 is cut to a required size to obtain an electrode plate 21 that is wound spirally to accommodate it in a cylindrical battery can 20 shown in FIG. 3.

Figure 4:
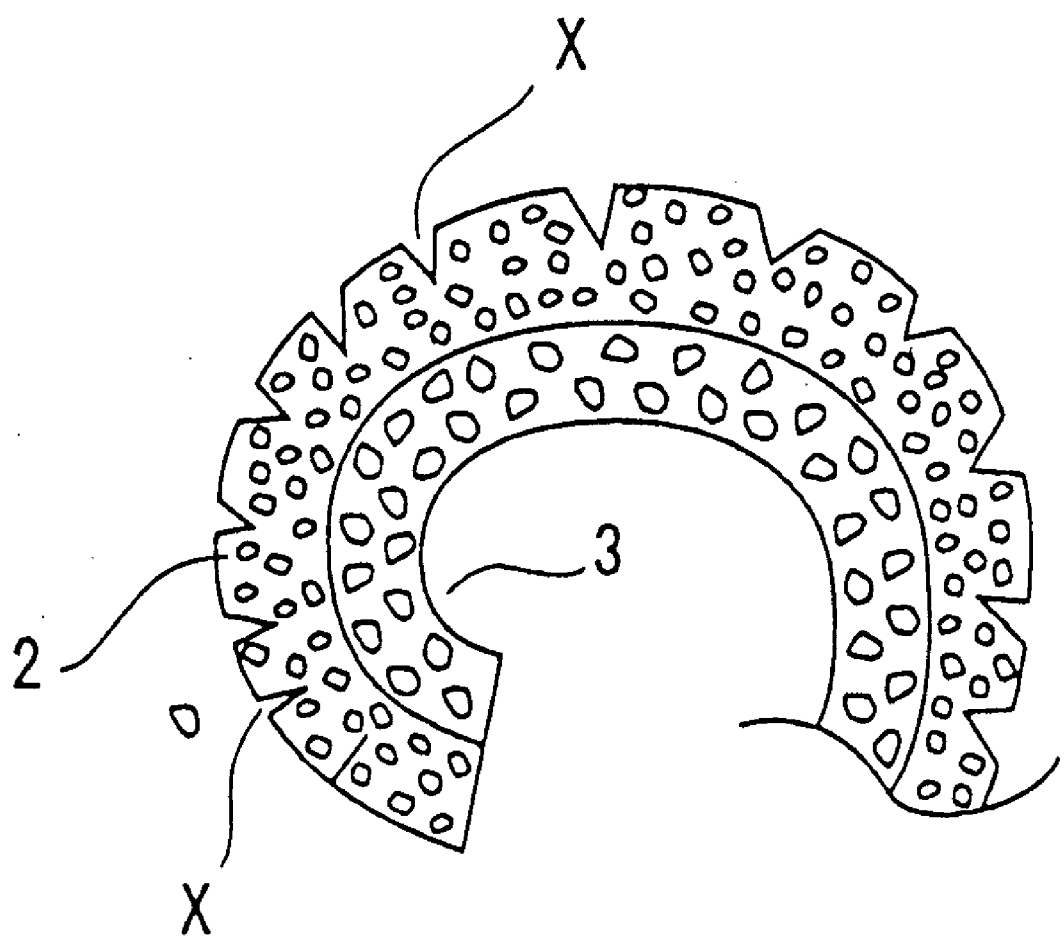
FIG. 4 is an enlarged sectional view showing an electrode wound spirally.

The electrode plate 21 is spirally wound with a separator interposed between adjacent spiral circles at a very small curvature. That is, the electrode plate 21 is so wound that the inner diameter of an innermost circle thereof is as small as about 3 mm. In this case, as shown in FIG. 4, the electrode plate 21 is wound, with the second foamed metal layer 2 located at the outer side thereof and the first foamed metal layer 3 located at the inner side thereof. This is because the second foamed metal layer 2 has a lower degree of strength and a lower elongation percentage relative to a tensile force than the first foamed metal layer 3. Further, as described previously, the outer side of a circular plate has a higher elongation percentage than the inner side thereof. Therefore, the second foamed metal layer 2 is very susceptible to crack. As such, the second foamed metal layer 2 has a large number of small cracks X, as shown in FIG. 4. Thus, the electrode plate 21 can be wound easily owing to the generation of the small cracks. The first foamed metal layer 3 having a higher degree of strength and a higher elongation percentage relative to the tensile force is disposed on the inner side of the electrode plate 21, and the tensile force applied to the electrode plate 21 is absorbed by many small cracks generated on the outer side thereof. Thus, the inner side thereof is not susceptible to crack. That is, the crack X generated on the outer surface of the electrode plate 21 does not reach its inner peripheral side. That is, the electrode plate 21 is prevented from being destroyed completely from the end of its peripheral surface to the end of its inner peripheral surface, because the crack generated at its peripheral surface does not spread to the end of its inner peripheral surface.

A test was conducted to check the generation state of crack of the spirally wound electrode plate of the first embodiment. A comparison test was conducted to check the generation state of crack of a spirally wound conventional electrode plate (comparison example) composed of only one foamed metal layer. The length of each electrode plate was 40 mm, and the thickness thereof was 587–679 μm. In the conventional electrode plate (comparison example) composed of the foamed metal layer, number of cells of its inner side and that of cells of its outer side was equally 50 PPI. The results of both tests are shown in table 1 (electrode plate of the present invention) and table 2 (electrode plate of comparison example).

Tables 1 and 2 show cracks in the thickness from the inner end of each spirally wound electrode plate toward the outer end thereof. The depth of crack indicates the dimension measured from the peripheral surface of each spirally wound electrode plate. The 100% crack indicates a complete breakage.

TABLE 1

|    | Position (mm) | Thickness (mm) | Depth (µm) | Breakage percentage (%) |
|----|---------------|----------------|------------|-------------------------|
| 1  | 2.230  | 626 | 476 | 76.0 |
| 2  | 2.931  | 618 | 544 | 88.0 |
| 3  | 3.589  | 618 | 503 | 81.4 |
| 4  | 4.913  | 613 | 442 | 72.1 |
| 5  | 5.318  | 603 | 440 | 73.0 |
| 6  | 6.033  | 628 | 500 | 79.6 |
| 7  | 6.396  | 623 | 420 | 67.4 |
| 8  | 7.265  | 665 | 497 | 74.7 |
| 9  | 7.741  | 638 | 487 | 76.3 |
| 10 | 8.994  | 619 | 346 | 55.9 |
| 11 | 9.399  | 647 | 325 | 50.2 |
| 12 | 10.595 | 645 | 434 | 67.3 |
| 13 | 11.740 | 651 | 412 | 63.3 |
| 14 | 12.222 | 622 | 533 | 85.7 |
| 15 | 13.801 | 626 | 436 | 69.6 |
| 16 | 14.530 | 630 | 380 | 60.3 |
| 17 | 15.280 | 622 | 459 | 73.8 |
| 18 | 15.683 | 640 | 448 | 70.0 |
| 19 | 16.090 | 648 | 478 | 73.8 |
| 20 | 17.278 | 631 | 417 | 66.1 |
| 21 | 17.813 | 644 | 485 | 75.3 |
| 22 | 18.495 | 640 | 444 | 60.4 |
| 23 | 19.432 | 631 | 263 | 41.7 |
| 24 | 20.522 | 634 | 406 | 64.0 |
| 25 | 21.283 | 637 | 530 | 83.2 |
| 26 | 22.234 | 633 | 367 | 58.0 |
| 27 | 22.735 | 626 | 455 | 72.7 |
| 28 | 23.603 | 617 | 513 | 83.1 |
| 29 | 24.596 | 618 | 408 | 66.0 |
| 30 | 25.191 | 620 | 391 | 63.1 |
| 31 | 26.121 | 637 | 268 | 42.1 |
| 32 | 27.531 | 620 | 509 | 82.1 |
| 33 | 28.261 | 623 | 409 | 65.7 |
| 34 | 29.179 | 619 | 189 | 30.5 |
| 35 | 29.888 | 631 | 417 | 66.1 |
| 36 | 31.004 | 623 | 450 | 72.2 |
| 37 | 31.779 | 639 | 435 | 68.1 |
| 38 | 32.587 | 623 | 288 | 46.2 |
| 39 | 33.748 | 630 | 296 | 47.0 |
| 40 | 34.715 | 647 | 217 | 33.5 |
| 41 | 35.495 | 679 | 503 | 74.1 |
| 42 | 35.985 | 626 | 386 | 61.7 |
| 43 | 36.594 | 629 | 397 | 63.1 |
| 44 | 37.203 | 622 | 422 | 67.8 |
| 45 | 38.132 | 643 | 426 | 66.3 |
| 46 | 39.102 | 635 | 455 | 71.7 |

TABLE 2

|    | Position (mm) | Thickness (mm) | Depth (µm) | Breakage percentage (%) |
|----|---------------|----------------|------------|-------------------------|
| 1  | 1.073  | 645 | 645 | 100.0 |
| 2  | 2.068  | 606 | 606 | 100.0 |
| 3  | 3.840  | 651 | 640 | 98.3  |
| 4  | 4.541  | 622 | 468 | 75.2  |
| 5  | 5.291  | 630 | 630 | 100.0 |
| 6  | 6.071  | 608 | 608 | 100.0 |
| 7  | 8.110  | 612 | 491 | 80.2  |

TABLE 2-continued

|    | Position (mm) | Thickness (mm) | Depth (µm) | Breakage percentage (%) |
|----|---------------|----------------|------------|-------------------------|
| 8  | 9.061  | 635 | 635 | 100.0 |
| 9  | 10.707 | 601 | 601 | 100.0 |
| 10 | 11.647 | 609 | 609 | 100.0 |
| 11 | 13.155 | 608 | 608 | 100.0 |
| 12 | 13.920 | 607 | 509 | 83.9  |
| 13 | 14.954 | 621 | 599 | 96.5  |
| 14 | 15.682 | 613 | 520 | 84.8  |
| 15 | 16.613 | 612 | 612 | 100.0 |
| 16 | 18.366 | 626 | 545 | 87.1  |
| 17 | 19.590 | 620 | 620 | 100.0 |
| 18 | 20.734 | 629 | 629 | 100.0 |
| 19 | 21.739 | 610 | 610 | 100.0 |
| 20 | 22.685 | 587 | 540 | 92.0  |
| 21 | 24.347 | 648 | 648 | 100.0 |
| 22 | 25.580 | 643 | 534 | 83.0  |
| 23 | 27.079 | 630 | 630 | 100.0 |
| 24 | 29.656 | 632 | 632 | 100.0 |
| 25 | 31.114 | 630 | 443 | 70.3  |
| 26 | 31.436 | 638 | 475 | 74.5  |
| 27 | 32.784 | 629 | 629 | 100.0 |
| 28 | 33.351 | 626 | 626 | 100.0 |
| 29 | 34.264 | 610 | 610 | 100.0 |
| 30 | 35.608 | 600 | 600 | 100.0 |
| 31 | 36.989 | 616 | 524 | 85.1  |
| 32 | 37.827 | 585 | 585 | 100.0 |
| 33 | 39.230 | 605 | 605 | 100.0 |

As shown in table 2, in the comparison example, the number of 100%-breakage electrode plates was 21. On the other hand, as shown in table 1, in the present invention, the number of 100%-breakage electrode plates was 0. That is, the breakage-generation percentage of the electrode plate of the present invention was 0%, whereas that of the electrode plate of the comparison example was 63.6%. In the electrode plate of the present invention, the pitch of crack X generated on the peripheral surface of the electrode plate was 0.87 mm, whereas in the comparison example, that of crack X generated on the peripheral surface of the electrode plate was 1.15 mm. It was confirmed that the number of small-crack generations of the electrode plate of the present invention was 1.3 times as much as that of small-crack generations of the electrode plate of the comparison example.

Figure 5:
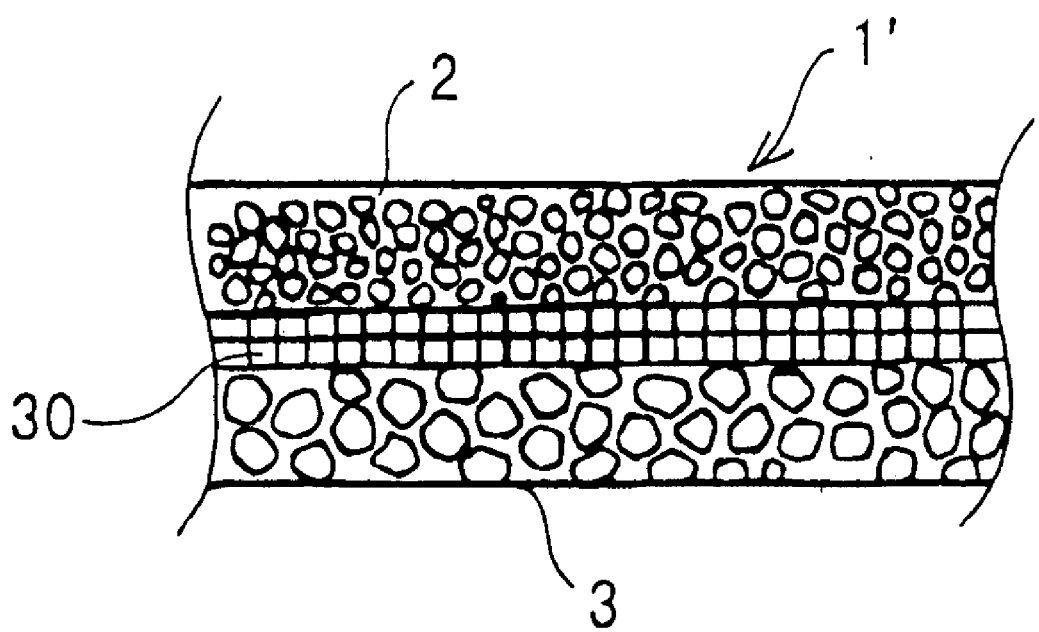
FIG. 5 is a sectional view showing a porous metal sheet of a second embodiment of the present invention.

FIG. 5 shows a second embodiment. The porous metal sheet of the first embodiment has the two-layer construction consisting of the second foamed metal layer 2 and the first foamed metal layer 3. In a porous metal material 1' of the second embodiment, a mesh metal layer 30 is interposed between the second foamed metal layer 2 and the first foamed metal layer 3 to form an integrated three-layer construction. As the mesh metal layer 30, a mesh metal wire is used. The mesh metal layer 30 is layered on inner and outer urethane sponge sheet, with the mesh metal layer 30 sandwiched therebetween. The layers of the metal wire and the urethane sponge sheets are plated. A mesh resin wire may be used instead of the mesh metal wire. In this case, the layers of the urethane sponge sheets and the mesh resin wire are also plated.

The mesh metal layer 30 interposed between the second foamed metal layer 2 and the first foamed metal layer 3 increases the tensile strength of the porous metal sheet 1' and makes it difficult for the crack X generated on the second foamed metal layer 2 to reach the first foamed metal layer 3. Thus, the generation of the breakage of the porous metal sheet 1' can be more securely prevented. Further, the charge speed of the active substance and the productivity of the electrode plate can be increased by enhancing the tensile strength.

Figure 6A:
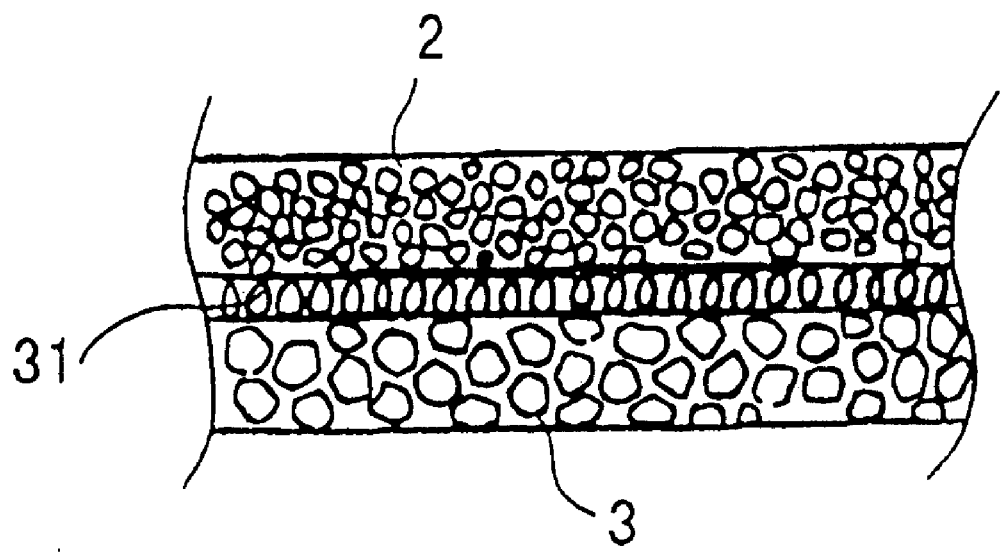
FIGS. 6A through 6C are sectional views showing modifications of a second embodiment of the present invention.
Figure 6B:
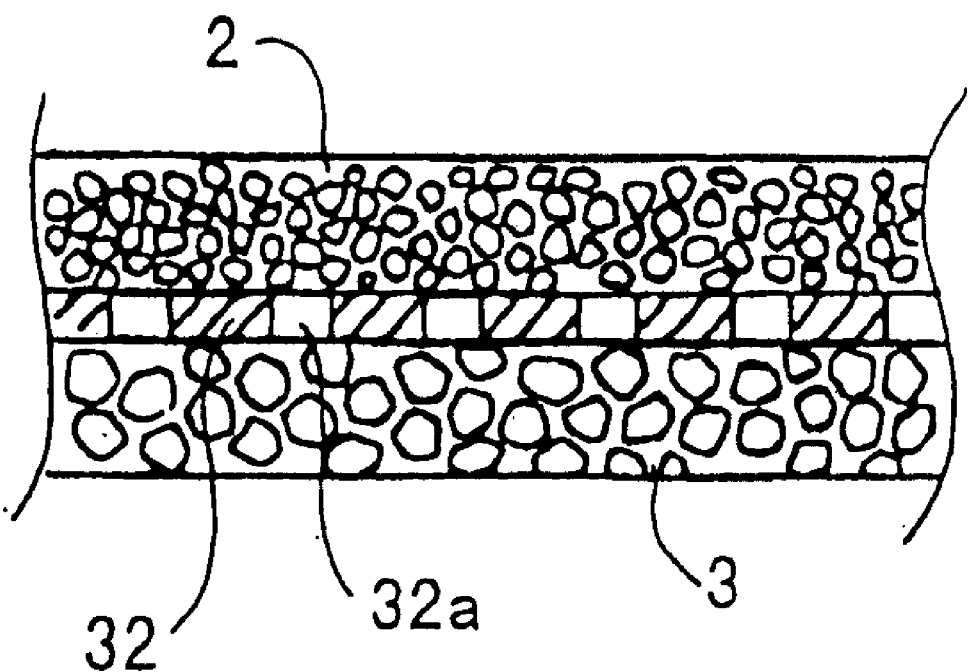
Figure 6C:
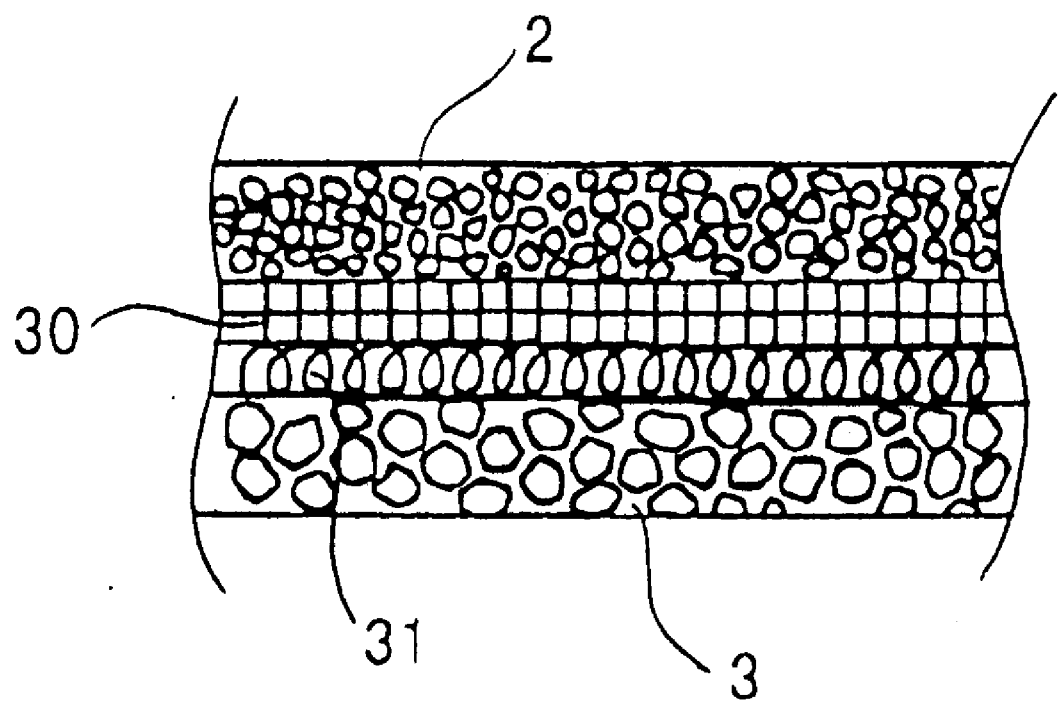
Figure 7A:
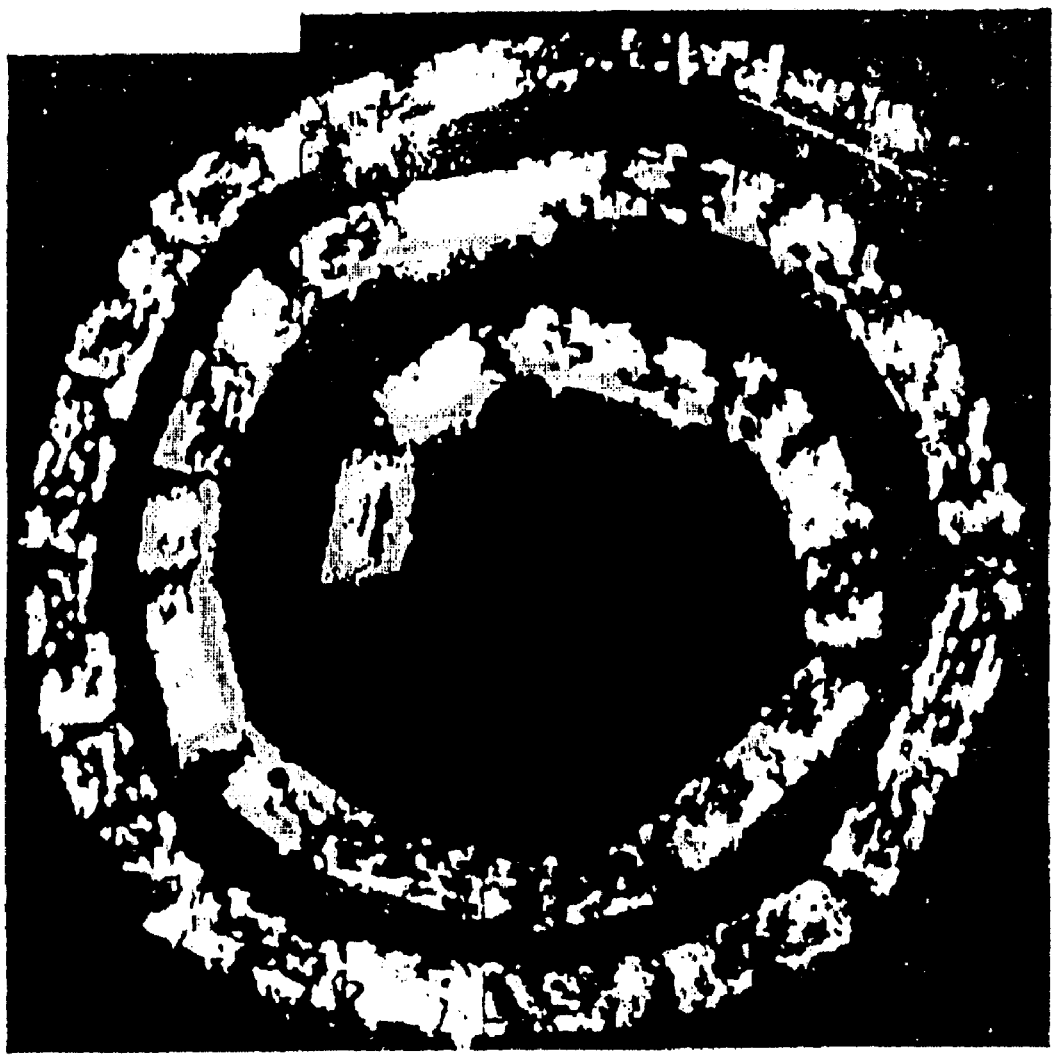
FIG. 7A shows a photograph showing a broken state of a conventional electrode plate.
Figure 7B:
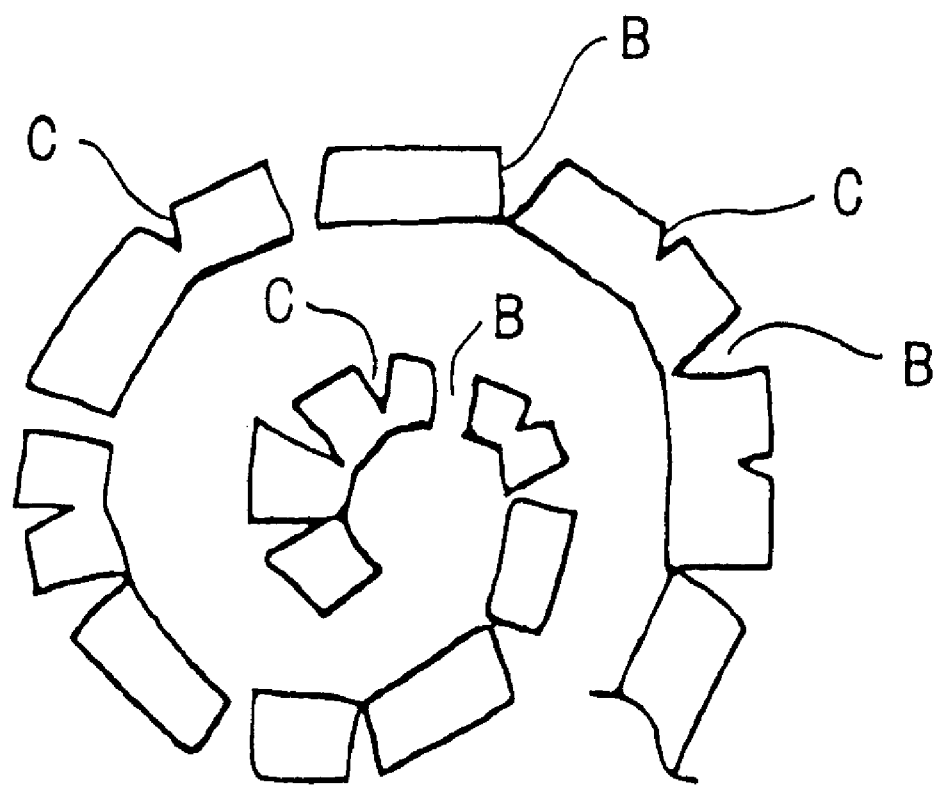
FIG. 7B is an illustration showing the broken state.

FIGS. 6A–6C show modifications of the porous metal sheet of the present invention having three or more layers. In the modification of FIG. 6A, a nonwoven metal layer 31 is interposed between second foamed metal layer 2 and the first foamed metal layer 3. In the modification of FIG. 6B, a metal sheet layer 32 having uniform pattern pores 32a formed therethrough is interposed between second foamed metal layer 2 and the first foamed metal layer 3. In the modification of FIG. 6C, the mesh metal layer 30 and the nonwoven metal layer 31 are interposed between second foamed metal layer 2 and the first foamed metal layer 3 to form a four-layer structure.

In the embodiments, when the electrode plate composed of the porous metal sheet is accommodated in the cylindrical battery can by spirally winding it, the second foamed metal layer having a larger number of cells and a lower strength relative to a tensile force than the first foamed metal layer is located on the outer side. However, depending on a rigidity of an electrode plate to be formed and a curvature of a spiral circle of the electrode plate, the second foamed metal layer may be located at the inner side of the spiral circle and the first foamed metal layer may be located on the outer side thereof to smoothly winding the electrode plate.

As apparent from the foregoing description, according to the present invention, the spirally wound porous metal sheet serving as the substrate of the electrode plate to be accommodated in a cylindrical battery can has the second foamed metal layer having a larger number of cells and the first foamed metal layer having a smaller number of cells. That is, one foamed metal layers having one strength and elongation percentages is disposed at one side of the electrode plate and the other having another strength and elongation percentage is disposed at the other side thereof. Accordingly, when the electrode plate is wound, the second foamed metal layer having a lower strength is placed on the outer side and the first foamed metal layer having a higher strength is placed on the inner side. This construction allows the electrode plate to be wound smoothly at a small curvature with a large number of small cracks being generated at the peripheral side of the electrode plate and makes it difficult for the cracks generated at its outer peripheral to reach its inner peripheral having the higher strength. Therefore, the electrode plate is prevented from being destroyed because the crack generated at the peripheral side of the electrode plate does not spread to the its inner peripheral surface.

What is claimed is:

1. A battery electrode plate comprising a porous metal sheet composed of a two-layer structure consisting of a first foamed metal layer and a second foamed metal layer adhered to the first foamed metal layer;

wherein the number of cells of said first foamed metal layer and that of said second foamed metal layer are different from each other; and wherein the two foamed metal layers are charged with an active substance.

2. The battery electrode plate according to claim 1, wherein the number of cells of said second foamed metal layer is more than that of said first foamed metal layer by specifying the number of cells of said first foamed metal layer to 30 PPI or more and less than 60 PPI and specifying the number of cells of said second foamed metal layer to 50 PPI or more and less than 80 PPI.

3. The battery electrode plate according to claim 1, wherein a thickness of a framework surrounding pores of said first foamed metal layer is larger than a thickness of a framework surrounding pores of said second foamed metal layer, and a strength of said second foamed metal layer relative to a tensile force is lower than a strength of said first foamed metal layer relative thereto.

4. The battery electrode plate according to claim 1, wherein a thickness of a framework surrounding pores of said first foamed metal layer is larger than a thickness of a framework surrounding pores of said second foamed metal layer, and a strength of said second foamed metal layer relative to a tensile force is lower than a strength of said first foamed metal layer relative thereto.

5. A battery accommodating an electrode plate in a cylindrical can, according to claim 1, wherein said electrode plate is spirally wound with said second foamed metal layer thereof located at a peripheral side thereof and with said first foamed metal layer thereof located at an inner peripheral side thereof.

6. A battery accommodating an electrode plate in a cylindrical can, according to claim 2, wherein said electrode plate is spirally wound with said second foamed metal layer thereof located at a peripheral side thereof and with said first foamed metal layer thereof located at an inner peripheral side thereof.

7. A porous metal sheet, for use in a battery electrode substrate, composed of a structure having three or more layers consisting of a first foamed metal layer, a second foamed metal layer and one or more metal layers sandwiched between and adhered to said first foamed metal layer and said second foamed metal layer and selected from a group consisting of a mesh metal layer, a nonwoven metal layer and a metal sheet layer having uniform pattern pores formed therethrough;

wherein the number of cells of said first foamed metal layer and that of said second foamed metal layer are different from each other.

8. The porous metal sheet according to claim 7, wherein the number of cells of said second foamed metal layer is more than that of said first foamed metal layer by specifying the number of cells of said first foamed metal layer to 30 PPI or more and less than 60 PPI and specifying the number of cells of said second foamed metal layer to 50 PPI or more and less than 80 PPI.

9. The porous metal sheet according to claim 7, wherein a thickness of a framework surrounding pores of said first foamed metal layer is larger than a thickness of a framework surrounding pores of said second foamed metal layer, and a strength of said second foamed metal layer relative to a tensile force is lower than a strength of said first foamed metal layer relative thereto.

10. The porous metal sheet according to claim 8, wherein a thickness of a framework surrounding pores of said first foamed metal layer is larger than a thickness of a framework surrounding pores of said second foamed metal layer, and a strength of said second foamed metal layer relative to a tensile force is lower than a strength of said first foamed metal layer relative thereto.

11. A battery electrode plate composed of a porous metal sheet, according to claim 7, charged with an active substance.

12. A battery electrode plate composed of a porous metal sheet, according to claim 8, charged with an active substance.

13. A battery accommodating an electrode plate in a cylindrical can, according to claim 11, wherein said electrode plate is spirally wound with said second foamed metal layer thereof located at a peripheral side thereof and with said first foamed metal layer thereof located at an inner peripheral side thereof.

14. A battery accommodating an electrode plate in a cylindrical can, according to claim 12, wherein said electrode plate is spirally wound with said second foamed metal layer located at a peripheral side thereof and with said first foamed metal layer thereof located at an inner peripheral side thereof.

* * * * *